United States Patent
Gholmieh et al.

(10) Patent No.: US 10,334,559 B2
(45) Date of Patent: Jun. 25, 2019

(54) PICH-HS TIMING AND OPERATION

(71) Applicant: QUALCOMM Incorporated, San Diego, CA (US)

(72) Inventors: Aziz Gholmieh, Del Mar, CA (US); Francesco Grilli, La Jolla, CA (US); Etienne François Chaponniere, La Jolla, CA (US); Oronzo Flore, Barcelona (ES)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/900,495

(22) Filed: Feb. 20, 2018

(65) Prior Publication Data

US 2018/0176884 A1    Jun. 21, 2018

Related U.S. Application Data

(62) Division of application No. 12/048,541, filed on Mar. 14, 2008.

(Continued)

(51) Int. Cl.
*H04W 68/02* (2009.01)
*H04W 72/12* (2009.01)
(Continued)

(52) U.S. Cl.
CPC ........ *H04W 68/025* (2013.01); *H04W 72/042* (2013.01); *H04W 72/12* (2013.01); *H04W 92/10* (2013.01)

(58) Field of Classification Search
CPC ........... H04W 68/025; H04W 52/0229; H04W 52/0232; H04W 72/1289
(Continued)

(56) References Cited

U.S. PATENT DOCUMENTS 5,189,411 A * 2/1993 Collar .................... G04G 21/04
                                                340/7.2
5,722,065 A * 2/1998 Ito ..................... H04W 52/0238
                                                340/7.34
(Continued)

FOREIGN PATENT DOCUMENTS

CN    1471254 A    1/2004
EP    1515575 A1   3/2005
(Continued)

OTHER PUBLICATIONS

ETSI Standards, Universal Mobile Telecommunications System (UMTS); Physical channels and mapping of transport channels onto physical channels (FDD), (3GPP TS 25.211 version 7.0.0 Release 7), Mar. 1, 2006, ETSI, Sophia Antipolis Cedex, France, XP014035547.

(Continued)

*Primary Examiner* — Joshua L Schwartz
(74) *Attorney, Agent, or Firm* — Patterson & Sheridan, LLP

(57) ABSTRACT

Systems and methodologies are described that facilitate employing a paging indicator channel in connection with high speed channels in a wireless communications network. A paging indicator transmission can be sent on the paging channel to one or more mobile devices. The paging indicator indicates that additional information such as a full paging messages, other control plane data or other user plane data is expected to be transmitted at a specific time instant (e.g., subframe) on the associated high speed channel. A set of parameters can be transmitted on common channels that specify a set of associated subframes in a high speed channel. Mobile devices can analyze the set of parameters to determine the associated subframes and receive the subframes in accordance with a schedule.

30 Claims, 16 Drawing Sheets

Related U.S. Application Data

(60) Provisional application No. 60/895,141, filed on Mar. 15, 2007, provisional application No. 60/895,399, filed on Mar. 16, 2007.

(51) Int. Cl.
*H04W 72/04* (2009.01)
*H04W 92/10* (2009.01)

(58) Field of Classification Search
USPC .................................................. 455/458, 515
See application file for complete search history.

(56) References Cited

U.S. PATENT DOCUMENTS

| | | | |
|---|---|---|---|
| 6,999,753 B2* | 2/2006 | Beckmann | H04W 68/025 455/412.2 |
| 2002/0012343 A1* | 1/2002 | Holloway | H04L 1/0003 370/389 |
| 2002/0077087 A1 | 6/2002 | Li | |
| 2003/0039230 A1 | 2/2003 | Ostman et al. | |
| 2004/0229605 A1* | 11/2004 | Hwang | H04W 68/00 455/426.1 |
| 2005/0053071 A1 | 3/2005 | Betts et al. | |
| 2005/0078648 A1 | 4/2005 | Nilsson | |
| 2005/0117553 A1* | 6/2005 | Wang | H04B 7/2618 370/338 |
| 2006/0104225 A1 | 5/2006 | Kim et al. | |
| 2008/0081651 A1 | 4/2008 | Kuroda et al. | |
| 2008/0227449 A1 | 9/2008 | Gholmieh et al. | |
| 2009/0010255 A1 | 1/2009 | Kim et al. | |
| 2009/0252109 A1 | 10/2009 | Kim, II et al. | |
| 2012/0147816 A1 | 6/2012 | Gholmieh et al. | |

FOREIGN PATENT DOCUMENTS

| | | |
|---|---|---|
| RU | 2003125333 A | 2/2005 |
| WO | 03056723 A1 | 7/2003 |
| WO | 2005104402 | 11/2005 |
| WO | 2005117299 A1 | 12/2005 |

OTHER PUBLICATIONS

International Search Report, PCT/US08/057283, International Search Authority, European Patent Office, dated Jul. 17, 2008.
Taiwan Search Report—TW097109414—TIPO—dated Dec. 9, 2011.
Vanghi V., et al.,"The CDMA 2000 System for Mobile Communications" Prentice Hall , 2004, pp. 231-232.
Written Opinion, PCT/US08/057283, International Search Authority, European Patent Office, dated Jul. 17, 2008.
Nokia Siemens Networks., et al "Text Proposal for Paging in Enhanced CELL_FACH," 3GPP Draft, R2-072209, Paging TPV1, 3rd GenerationPartnership Project (3GPP), Mobile Competence Centre 650, Route Des Lucioles, F-06921 Sophiaantipolis, Cedex, France, vol. RAN WG2, Kobe, Japan, May 15, 2007, XP050135058, 3 Pages.
Qualcomm Europe: "Timing Relation Between PICH and HS-SCCH,"3GPP Draft, R2-070806, 3rd Generation Partnership Project (3gpp), Mobile Competence Centre, 650, Route Des Lucioles, F-06921 Sophia-Antipolis, Cedex, France, vol. RAN WG2, St. Louis, USA, Feb. 20, 2007, XP050133831, 7 Pages.

\* cited by examiner

PICH-HS TIMING AND OPERATION

CROSS-REFERENCE TO RELATED APPLICATIONS

The present application for patent is a divisional application of U.S. application Ser. No. 12/048,541, entitled PICH-HS Timing and Operation, filed Mar. 14, 2008 which claims priority to U.S. Provisional Application No. 60/895,141, entitled PICH-HS Timing and Operation, filed Mar. 15, 2007 and also claims priority to U.S. Provisional Application No. 60/895,399, entitled PICH-HS Timing and Operation, filed Mar. 16, 2007, assigned to the assignee hereof, and expressly incorporated herein incorporated by reference.

BACKGROUND

I. Field

The following description relates generally to wireless communications, and more particularly to relative timing and operation between paging indicator channel and high speed channels.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method for employing a paging indicator channel in association with high speed channels is described herein. The method can comprise transmitting a paging indicator in a paging indicator channel to at least one mobile device. Moreover, the method can comprise scheduling information intended for the at least one mobile device on a high speed channel, the scheduling is based at least in part on presence of the paging indicator and a set of parameters transmitted on common channels. The method can also comprise sending the information to the at least one mobile device on the high speed channel.

Another aspect relates to a wireless communications apparatus that can comprise a memory retains instructions related to transmitting a paging indicator in a paging indicator channel to at least one mobile device, scheduling information intended for the at least one mobile device on a high speed channel, the scheduling is based at least in part on a set of parameters transmitted on common channels and sending the information to the at least one mobile device on the high speed channel. The wireless communications apparatus can also include a processor coupled to the memory and configured to execute the instructions retained in the memory.

Yet another aspect relates to a wireless communications apparatus that facilitates serving a high speed channel with a paging indicator channel. The apparatus can include means for transmitting a paging indicator in a paging indicator channel to at least one mobile device. The apparatus can further comprise means for scheduling information intended for the at least one mobile device on a high speed channel, scheduling is based at least in part on a set of parameters transmitted on common channels. In addition, the wireless communications apparatus can include means for sending the information to the at least one mobile device on the high speed channel.

Still another aspect relates to a machine-readable medium having stored thereon machine-executable instructions for transmitting a paging indicator in a paging indicator channel to at least one mobile device. In addition, the machine-readable medium can further comprise instructions for scheduling information intended for the at least one mobile device on a high speed channel, scheduling is based at least in part on a set of parameters transmitted on common channels. Moreover, the machine-readable medium can include instructions for sending the information to the at least one mobile device on the high speed channel.

According to another aspect an apparatus can comprise an integrated circuit in a wireless communication system. The integrated circuit can be configured to transmit a paging indicator in a paging indicator channel to at least one mobile device. The integrated circuit can further be configured to schedule information intended for the at least one mobile device on a high speed channel, wherein the integrated circuit is configured to schedule information based at least in part on a set of parameters transmitted on common channels. In addition, the integrated circuit can be configured to send the information to the at least one mobile device on the high speed channel.

According to yet another aspect, a method for utilizing paging to retrieve information on high speed channels is described herein. The method can comprise receiving a transmission on a paging indicator channel. The method can further include ascertaining a set of parameters included in common channels that specify a configuration of the corresponding data on the high speed channel. In addition, the method can comprise decoding the corresponding data in accordance with the set of parameters.

Another aspect described herein relates to a wireless communications apparatus that can include a memory. The memory can retain instructions related to receiving a transmission on a paging indicator channel, ascertaining a set of parameters included in common channels that specify a configuration of the corresponding data on the high speed channel and decoding the corresponding data in accordance with the set of parameters. In addition, the wireless communications apparatus can include a processor coupled to the memory and configured to execute the instructions retained in the memory.

Yet another aspect relates to a wireless communications apparatus that facilitates retrieving information on high speed channels. The apparatus can comprise means for receiving a transmission on a paging indicator channel. The apparatus can also comprise means for means for ascertaining a set of parameters included in common channels that specify a configuration of the corresponding data on the high speed channel. In addition, the apparatus can include means for decoding the corresponding data in accordance with the set of parameters.

Still another aspect relates to a machine-readable medium having stored thereon machine-executable instructions for receiving a transmission on a paging indicator channel. The machine-readable medium can further include instructions related to ascertaining a set of parameters included in common channels that specify a configuration of the corresponding data on the high speed channel. In addition, the machine-readable medium can comprise instructions for decoding the corresponding data in accordance with the set of parameters.

A further aspect describe herein relates to an apparatus in a wireless communication system comprising an integrated circuit. The integrated circuit can be configured to receive a transmission on a paging indicator channel. The integrated circuit can be further configured to ascertain a set of parameters included in common channels that specify a configuration of the corresponding data on the high speed channel. In addition, the integrated circuit can be configured to decode the corresponding data at in accordance with the set of parameters.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
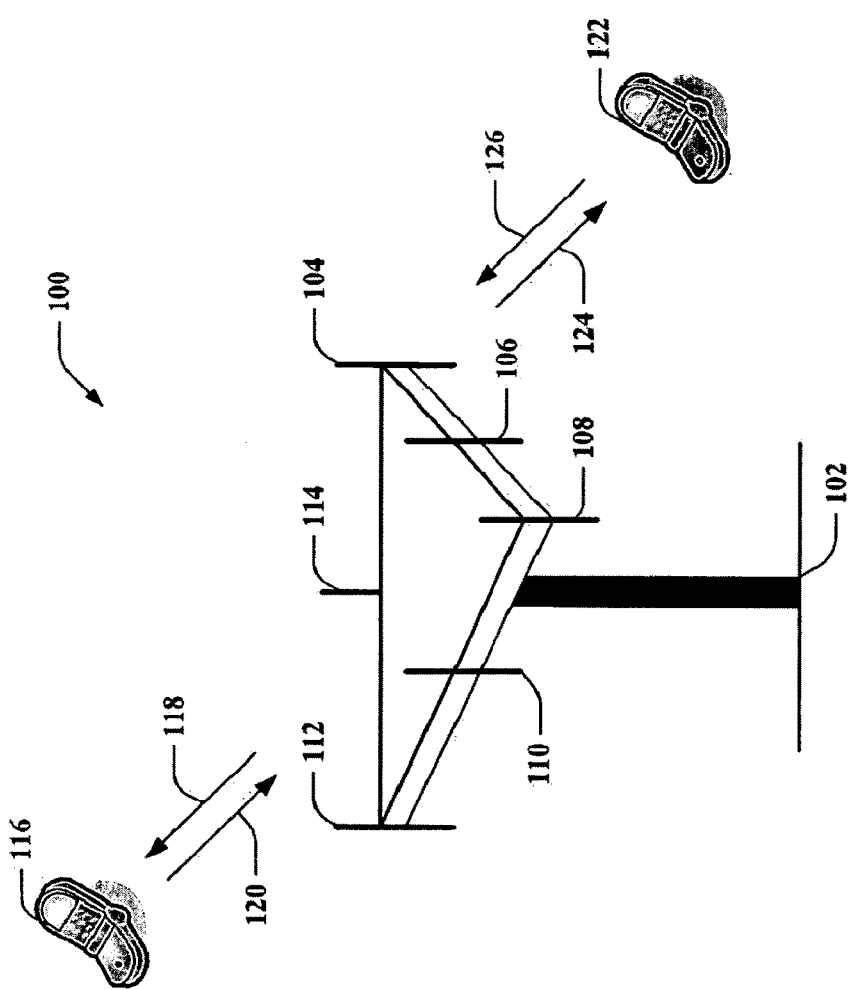
FIG. 1 is an illustration of a wireless communication system in accordance with various aspects set forth herein.

The techniques described herein may be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system may implement a radio technology such as Global System for Mobile Communications (GSM). An OFDMA system may implement a radio technology such as Evolved Universal Terrestrial Radio Access (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station.

A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

Figure 2:
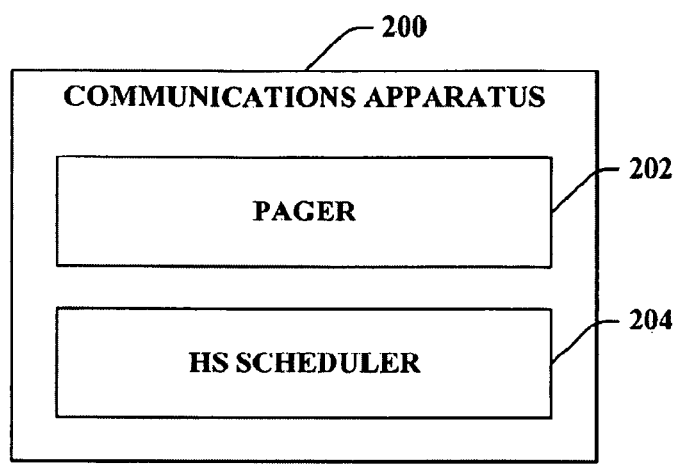
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. A paging indicator channel (PICH) can be employed to notify a mobile device that it is possibly being paged. The mobile device reads another channel to verify the page. Conventionally, the mobile device read the secondary common control physical channel (S-CCPCH). However, the communications apparatus can employ the PICH with high speed channels in addition to the S-CCPCH channel. For example, the high speed channels can include a high speed physical downlink shared channel (HS-PDSCH) and/or a high speed shared control channel (HS-SCCH). The communications apparatus can employ components described below to facilitate timing and operation of the PICH channel with high speed channels. The communications apparatus 200 can include a pager 202 that can transmit a paging indicator to one or more mobile devices and an HS scheduler 204 that can schedule and transmit data associated with the PICH channel for the mobile device corresponding to the paging indicator.

According to an example, the communications apparatus 200 can employ the PICH channel in connection with the S-CCPH or high speed channels to facilitate paging a mobile device and/or a plurality of mobile devices. This can occur, for example, when the communications apparatus 200 detects data (e.g., incoming call, downloadable data, etc.) that is to be transmitted to the mobile device. The pager 202 sends a paging indicator to a mobile device on the PICH channel. It is to be appreciated that the pager 202 can send a plurality of paging indicators to a plurality of mobile devices. In one embodiment, the paging indicator is set in a PICH frame by the pager 202. The paging indicator notifies a mobile device that data is located on at least one other channel. The mobile device reads the other channels to verify that the paging indicator actually designates a page to the mobile device (e.g., that the data on the other channel is the mobile device's data). The pager 202 can interoperate with both the S-CCPCH channels and high speed channels such as a high speed shared control channel (e.g., HS-SCCH) and/or a high speed shared data channel (e.g., HS-DSCH, HS-PDSCH, etc.). When a paging indicator is received by user equipment or mobile device, the paging indicator informs the mobile device that it should expect to receive more information such as a full paging message, other control plane data or user plane data at a specific time instance (e.g., subframe) on associated high speed channels. The association between paging indicator and high speed channels can be determined by a set of parameters established as a standard or signaled in overhead signaling messages on common channels. The communications apparatus 200 can provide the set of parameters that define scope, length and timing of data on the high speed channels. In one embodiment, the base station 200 can announce the set of parameters on common channels. According to another aspect, the base station 200 can announce a subset on common channels and the remaining parameters in the set can be announced per transmission on dedicated messages (e.g., signaled on dedicated channels). Pursuant to an illustration, the set of parameters can be transmitted on, for example, a broadcast channel along with other system information. It is to be appreciated that other common channels can be employed. For example, the set of parameters or a subset thereof can be transmitted on the high speed shared control channel (e.g., HS-SCCH channel). These parameters can be employed by the HS scheduler 204 to schedule data associated with the paging indicator on the high speed channel.

The HS scheduler 204 can schedule data for a mobile device associated with the paging indicator on the high speed channel based at least in part on the set of parameters provided by the pager 202. The parameters indicate a set of high speed shared control channel subframes or high speed shared data channel subframes that are associated with paging indicator on the PICH channel. For example, the set of parameters can indicate a number of subframes that a mobile device should attempt to receive, a number of retransmissions possible in a HARQ scenario, a degree of multiplexing or interleaving between subframes destined for different mobile devices and/or a number of subframes a mobile device should monitor following successful receipt. The paging indicator set in the PICH by pager 202 can indicate that a paging message, upper layer signaling specific to a mobile device or mobile device specific data is to be scheduled for the mobile device. The HS scheduler 204 can schedule the paging message, upper layer signaling or device specific data in one of the associated subframes on the high speed channel. The HS scheduler 204 determines an appropriate time to schedule based upon an offset determined for the lifetime of the channels.

Figure 3:
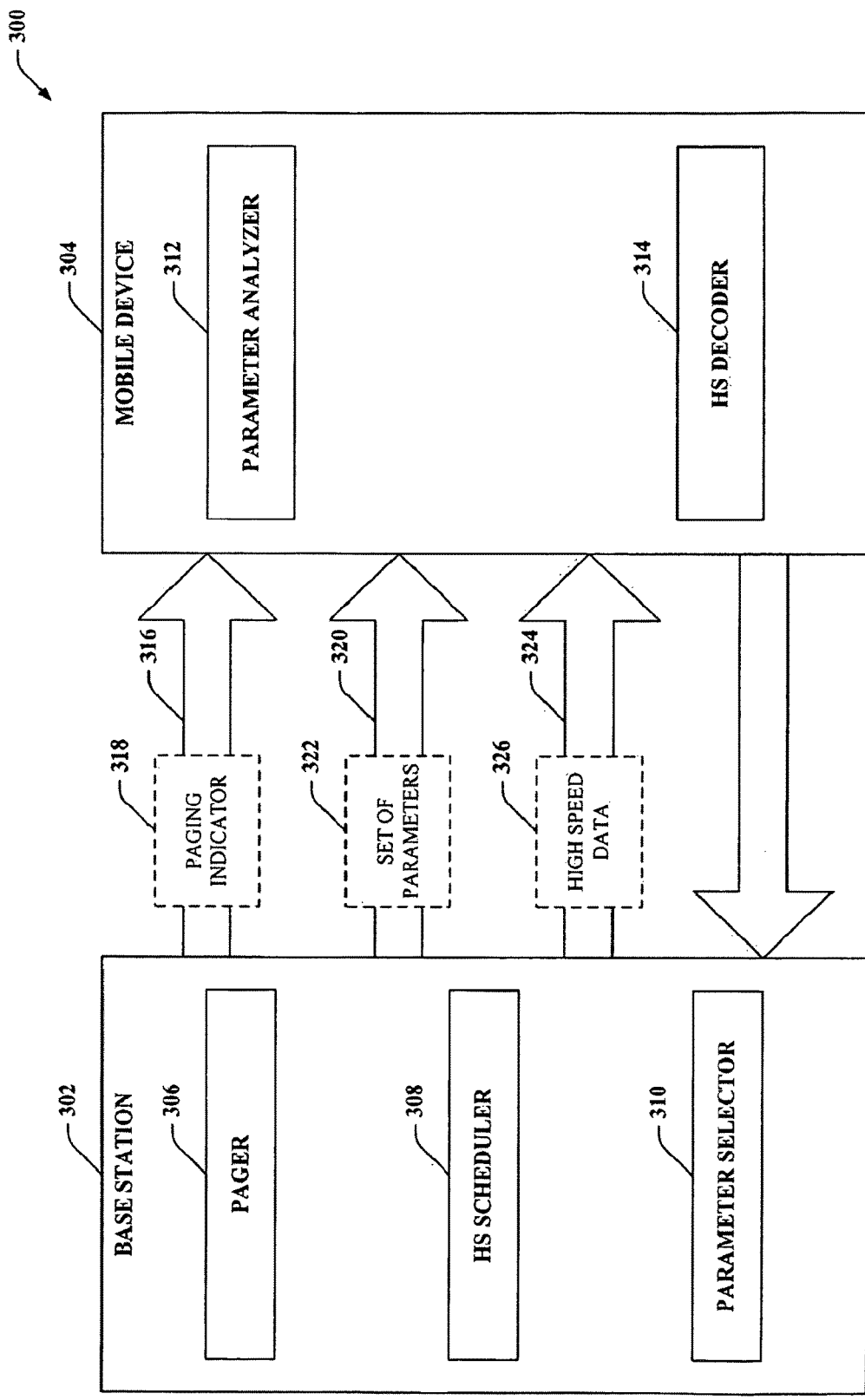
FIG. 3 is an illustration of an example wireless communications system that enables relative timing and operation between paging channels and high speed channels.

Now referring to FIG. 3, illustrated is a wireless communications system 300 that can generate a paging indicator that can be utilized to receive data on a high speed channel such a high speed shared control channel and/or a high speed shared data channel. The system 300 includes a base station 302 that communicates with a mobile device 304 (and/or any number of disparate mobile devices (not shown)). Base station 302 can transmit information to mobile device 304 over a forward link channel; further base station 302 can receive information from mobile device 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the mobile device 304 as well and vice versa, in one example; the configuration depicted excludes these components for ease of explanation.

Base station 302 includes a pager 306 that can transmit a paging indicator 318 to one or more mobile devices, an HS scheduler 308 that can schedule and transmit data for the mobile device and associated with the paging indicator 318. Additionally, the base station 302 can include a parameter selector 310 that can determine a set of parameters 322 sent to mobile device 304 on a common channel 320 (e.g., HS-SCCH, a broadcast channel, etc.). The set of parameters 322 can establish a configuration for mobile device 304 to utilize when receiving data on a high speed channel 324 in response to a paging indicator 318. The parameter selector 310 can ascertain parameters 322 based upon scope and content of data to be transmitted to the mobile device 304 as well as configurations of system 300. For example, the parameter selector 310 can choose parameters 322 for the high speed transmission associated with the paging indicator 318 such that the parameters 322 conform to the configuration of the system 300 (e.g., HARQ configurations, HS-SCCH operation, HS-SCCH less operation, etc.).

Mobile device 304 includes a parameter analyzer 312 that analyzes the set of parameters 322 to determine how data will be transmitted on a HS channel 324 in association with a paging indicator 318 and a HS decoder 314 that retrieves data on the high speed channel 324 (e.g., HS-SCCH, HS-PDSCH, HS-DSCH, etc.) in accordance with the analyzed parameters. In one example, the mobile device 304 can receive a paging indicator 318 from the base station 302 on a paging indicator channel 316 that indicates a possibility that the mobile device 304 is being paged The mobile device 304 can read another channel to ascertain if it is being paged and, if so, retrieve data on the other channel. Pursuant to an example, the other channel can be the high speed channel 324 and the data retrieved can be high speed data 326.

According to an example, the base station 302 can obtain data for the mobile device 304. The data can be from another mobile device (e.g., a voice communication, a data transfer, etc.), a wired device on a network communicatively coupled to the base station 302, a server and the like. It is to be appreciated that the base station 302 can possess data to be transmitted to the mobile device 304 (e.g. power control data, assignment data, etc.). The pager 306 of base station 302 can transmit a paging indicator 318 to the mobile device 304 on the paging indicator channel (PICH) 316 to notify the mobile device 304 that data is waiting. The timing of the paging indicator 318 can be based at least in part on the discontinuous reception (DRX)/wake up cycle of mobile device 304. For instance, the pager 306 can set the paging indicator 318 when the mobile device 304 wakes up to listen for pages every DRX period. The pager 306 sets the paging indicator 318 in a PICH frame to notify the mobile device 304 that high speed data 326 is scheduled in associated subframes of the high speed channel 324 (e.g., HS-SCCH channel or the HS-PDSCH channel). In one aspect, the high speed data 326 can include a paging message, upper layer signaling specific to mobile device 304 or data specific to mobile device 304. Pursuant to an illustrative embodiment, the paging indicator 318 set on the PICH channel 316 points to a set of associated subframes on the HS channels 324. Following the paging indicator 318, the HS scheduler 308 of the base station 302 schedules the high speed data 326 on the high speed channels 324 in accordance with the set of parameters 322 established by the parameter selector 310 (e.g., schedules the information on the set of associated subframes). A timing offset between the time the PICH frame with the paging indicator 318 ends and the beginning of a first subframe in the set of associated subframes is established for the lifetime of the channels. The timing offset can be transmitted by the base station 302 on the common channel 320. The mobile device 304 can employ the timing offset to properly synchronize receipt of the paging indicator 318 and the associated transmitted information 326 on the high speed channels 324.

The base station 302 provides parameter selector 310 that determines a set of parameters 322 that can be transmitted as overhead signaling on a common channel 320. The set of parameters 322 relates to how data 326 associated with a paging indicator 318 is transmitted on a high speed channel 324. The parameter selector 310 ascertains a first set of high speed subframes (e.g., HS-SCCH/HS-PDSCH subframes) pointed to by the paging indicator 318. This parameter, which can be denoted NUM_HS_SUBFRAMES_SET1, indicates the number of subframes that mobile device 304 should attempt to receive. According to an aspect, this value can be n frames where n is an integer value between 5 and 20, inclusive. In addition, the parameter selector 310 can determine a second set of subframes that the mobile device 304 should attempt to receive. The parameter, NUM_HS_SUBFRAMES_SET2, indicates the number of subframes the mobile device 302 extends it monitoring following successful receipt of the first set. In addition, the parameter selector 310 can determine parameters associated with hybrid automatic repeat requests (HARQ) configurations. For example, the parameter selector 310 can establish BLIND_HARQ_NUM_RETRANS that indicates a number of transmission repeats for the forward link only. Moreover, the parameter selector 310 can establish BLIND_HARQ_STRIDE that indicates spacing in terms of subframes for the aforementioned retransmissions. Pursuant to an illustration, forward link transmission can be repeated BLIND_HARQ_NUM_RETRANS times every (BLIND_HARQ_STRIDE+1) subframe(s). According to an aspect, BLIND_HARQ_NUM_RETRANS can be an integer between 0 and 7 inclusive and BLIND_HARQ_STRIDE can be established between 0 and 5 inclusive. The parameter selector 310 can determine a floor and ceiling for the number of HARQ instances based upon the chosen parameters. For example, a ceiling can be given by (NUM_HS_SUBFRAMES_SET1/(BLIND_HARQ_NUM_RETRANS+1)) or a floor can be provided by the same formulation. Moreover, the parameter selector 310 instructs the HS scheduler 308 how to schedule HARQs. Pursuant to an illustration, each (BLIND_HARQ_STRIDE+1) HARQs are interleaved. Transmissions are back to back when the stride parameter is zero. When the stride parameter is set to one, two HARQs are interleaved and so on.

In accordance with another aspect, the parameter selector 310 can determine parameters based upon configurations of the network or other entity. For example, regular HS-SCCH and HS-SCCH less operations can be employed. However, the parameter selector 310 can indicate that bit exact HS-SCCH repetition is to be utilized to enable the mobile device 304 to employ Chase combining. In addition, incremental redundancy HARQ can be predefined and the parameter selector 310 can utilize the predefinition. Moreover, the parameter selector 310 can optimize parameter coding in the common channel 320 to avoid combinations of parameters that cannot be achieved. In addition, it is to be appreciated that the set of parameters 322 can be conveyed to mobile device 304 during connection negotiation.

The mobile device 304, upon receiving the paging indicator 318, can retrieve a high speed data transmission 326 from the base station 302 scheduled on another channel such as the S-CCPCH channel, the HS-SCCH channel, the HS-PDSCH channel or other high speed channel. The parameter analyzer 312 analyzes a set of parameters 322 on a common channel 320 to determine the parameters established by the parameter selector 310 of the base station 302. The parameters 322 instruct the mobile device 304 the subframes to receive and/or how the subframes are organized. The timing offset established for the lifetime of the channels indicates when the set of associated subframes determined by the parameter analyzer 312 are scheduled on the HS channels 324. The HS decoder 314 of the mobile device 304 subsequently receives and decodes the subframes in accordance with the parameters. For example, the HS decoder 314 receives and decodes the number of subframes on the HS channels 324 indicated by the corresponding parameter. Following successful receipt of the first set of subframes, the HS decoder 314 monitors and attempts to receive a second set of subframes.

According to another aspect, system 300 supports both HS-SCCH and HS-SCCH less operations. These operations are configured by the network. In HS-SCCH less operation, the mobile device 304 is configured with a set of transport formats. In addition, the mobile device 304 is configured with one or more walsh channels that can be blindly decoded. Moreover, pursuant to an illustrative embodiment, two high speed downlink shared channels (HS-DSCH) Radio Network Transaction Identifiers (H-RNTI) are monitored by the mobile device 304 at all times. In one aspect, the two H-RNTIs can be a common and dedicated H-RNTI.

Figure 4:
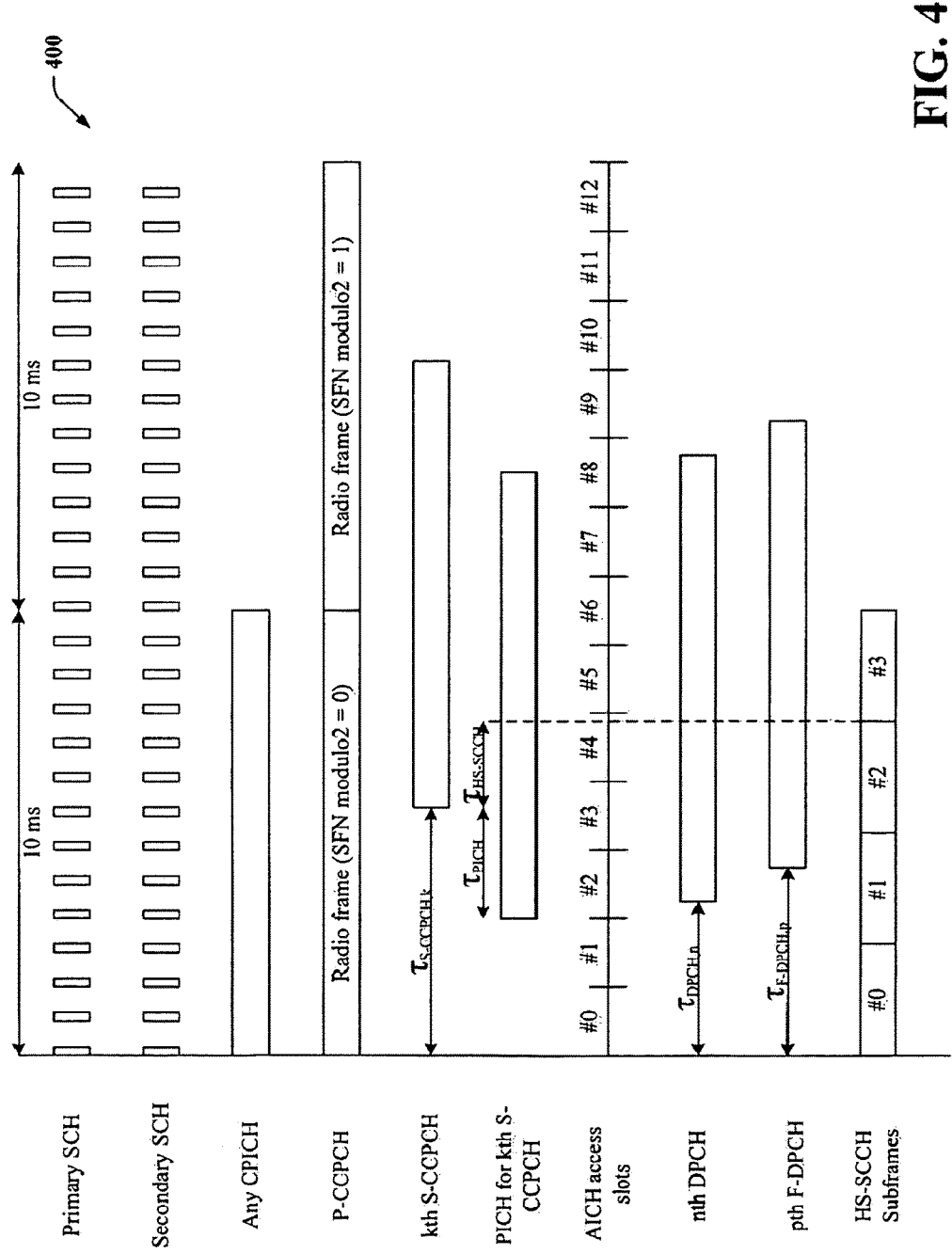
FIG. 4 is an illustration of an example timing diagram that indicates relative timing in accordance with an aspect of the subject disclosure.

Now referring to FIG. 4, an example timing diagram 400 that illustrates PICH to HS timing. The timing diagram 400 depicts relative timing between a variety of channels in communications system. For example, the timing diagram 400 includes primary and secondary synchronization channels (SCH), any common pilot channel (CPICH), a primary common control channel (P-CCPCH), a secondary common control channel (S-CCPCH), a paging indicator channel (PICH), acquisition indicator channel (AICH) access slots, a dedicated physical channel (DPCH), a fractional dedicate physical channel (F-DPCH) and HS-SCCH subframes. The PICH can be employed with both S-CCPCH and HS-SCCH. As shown in the timing diagram 400, S-CCPCH and HS-SCCH operate on different timings. Accordingly, offsets need to be determined to account for timing differences.

As the PICH can serve both S-CCPCH and HS-SCCH, the conventional timing needs adjustment. Conventionally, the PICH served the S-CCPCH and provided a timing $\tau_{PICH}$ that indicated the offset between the PICH frame and an associated S-CCPCH frame. In an embodiment, $\tau_{PICH}$ is 7680 chips in duration. However, this duration after a PICH frame can align with a middle portion of a HS-SCCH subframe. Accordingly, an additional offset $\tau_{HS\text{-}SCCH}$ needs to be established. Pursuant to an illustration, $\tau_{HS\text{-}SCCH}$ is determined by the respective frame offset of the PICH frame and HS-SCCH subframe as illustrated in the timing diagram 400.

Figure 5:
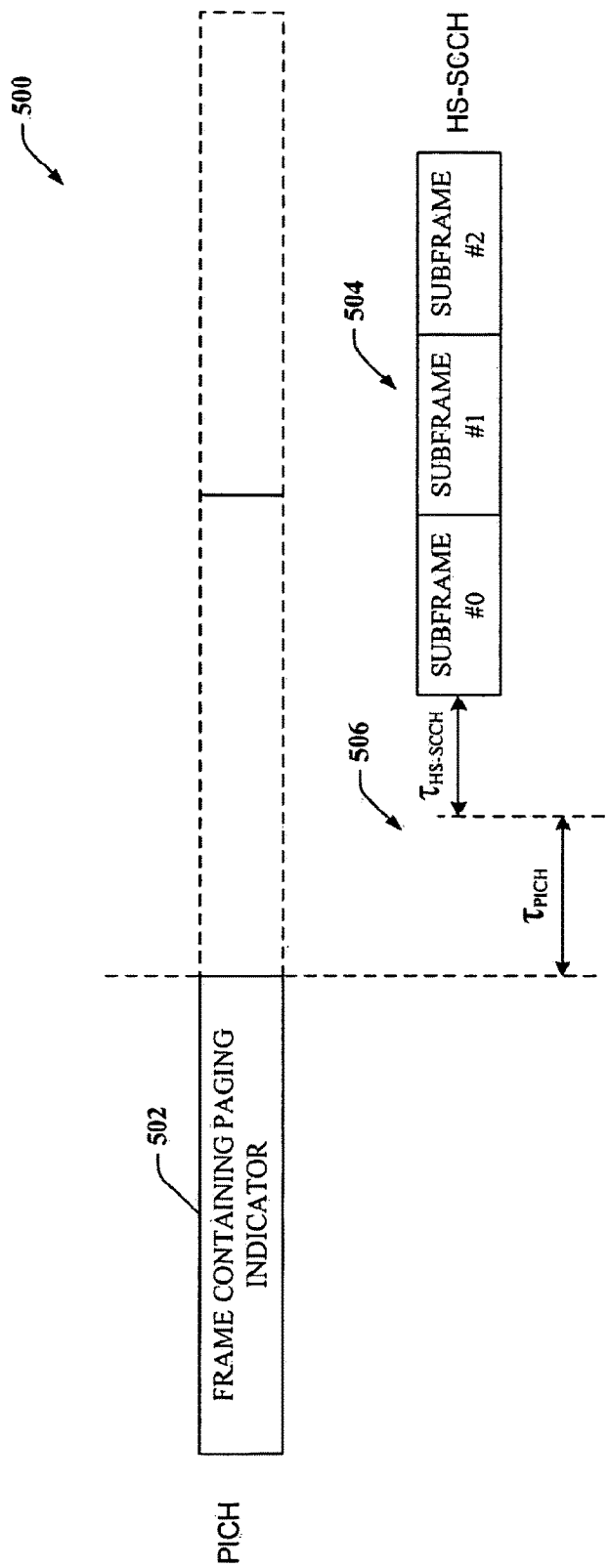
FIG. 5 is an illustration of an example relative timing diagram between a paging channel and a high speed channel according to an aspect.

Turning now to FIG. 5, illustrated is an exemplary timing diagram 500 that further depicts the timing between PICH and HS-SCCH. The timing diagram 500 includes a PICH frame 502 that includes a paging indicator pointing to a set of associated HS-SCCH subframes 504 and an offset 506 that specifies the timing offset therebetween. According to an example, the first HS-SCCH subframe in the set of associated subframes 504 starts $\tau_{PICH} + \tau_{HS\text{-}SCCH}$ chips after the transmitted PICH frame 502 that includes the paging indicator. Pursuant to an illustration, $\tau_{PICH}$ is 7680 chips. Thus, $\tau_{HS\text{-}SCCH}$ can be determined as the offset between a time computed as the end of the PICH frame plus 7680 chips. In accordance with an aspect, $\tau_{HS\text{-}SCCH}$ is less than 7680 chips (e.g., less than the duration of $\tau_{PICH}$). According to another aspect, $\tau_{HS\text{-}SCCH}$ can be zero. Thus, $\tau_{PICH}$ is the only timing required and can be relative only to HS-SCCH/HS-DSCH. In addition, it is to be appreciated that multiple PICH channels can exist that point to multiple or a plurality of HS channels (e.g., HS-SCCH and/or HS-DSCH).

Referring now to FIGS. 6-9, exemplary diagrams are depicted in accordance with an aspect of the subject disclosure. For the purposes of simplicity of explanation, the examples illustrate timing diagrams that include a PICH channel, a HS-SCCH channel and a HS-PDSCH channel. Each block in a row of a channel indicates a frame and/or subframe. It is to be appreciated that FIGS. 6-9 are for illustrative purposes and the disclosed subject matter is not limited to the scope of these examples. Those skilled in the art should appreciate how the timing diagrams can be extended to other channel pairings, parameter combinations, etc.

Figure 6:
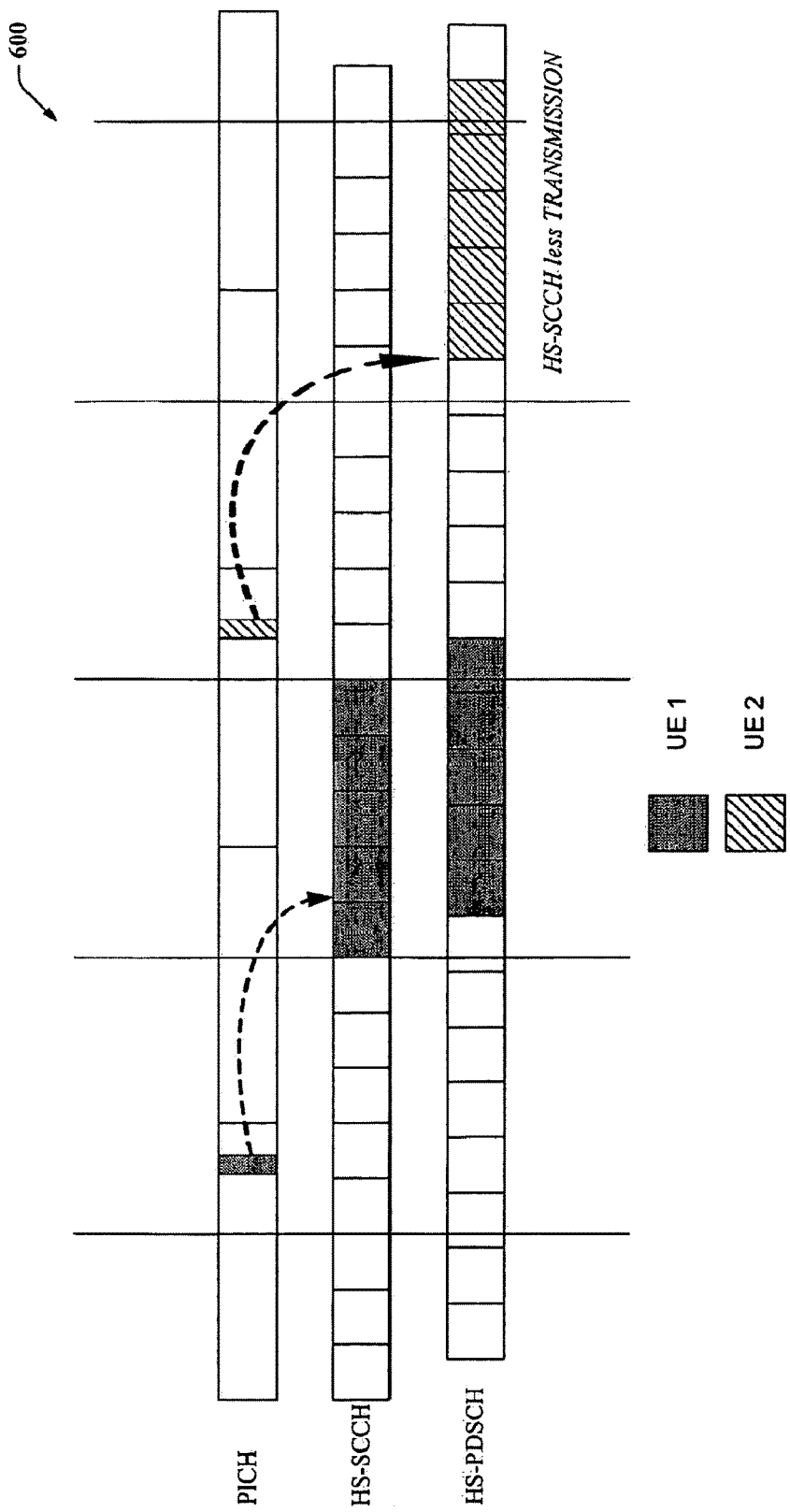
FIG. 6 is an illustration of an example diagram that depicts relative operation between paging indicators and high speed data.

In FIG. 6, an example 600 is illustrated that depicts PICH to HS operation with two user equipment (UE) devices, UE1 and UE2. In example 600, the parameter NUM_HS_SCCH_SET1 is 5, BLIND_HARQ_NUM_RETRANS is 4, BLIND_HARQ_STRIDE is 0 and BLIND_HS_SCCH_SET2 is 0. As shown in example 600, UE1 wakes up 3 HS-SCCH subframes after the end of the PICH radio frame that includes the paging indicator to UE1. UE1 attempts to decode any transmission on the associated HS-SCCH or HS-SCCH less channels (e.g., HS-PDSCH) for 5 subframes. The transmission is repeated for 5 subframes. Subsequently, UE1 can employ discontinuous reception (DRX). Similarly, UE2 wakes up 3 subframes after the end of the PICH radio frame that includes the paging indicator to UE2. UE2 is configured to utilize HS-SCCH less operation and attempts to decode any transmission on the HS-PDSCH channel for the next 5 subframes.

Figure 7:
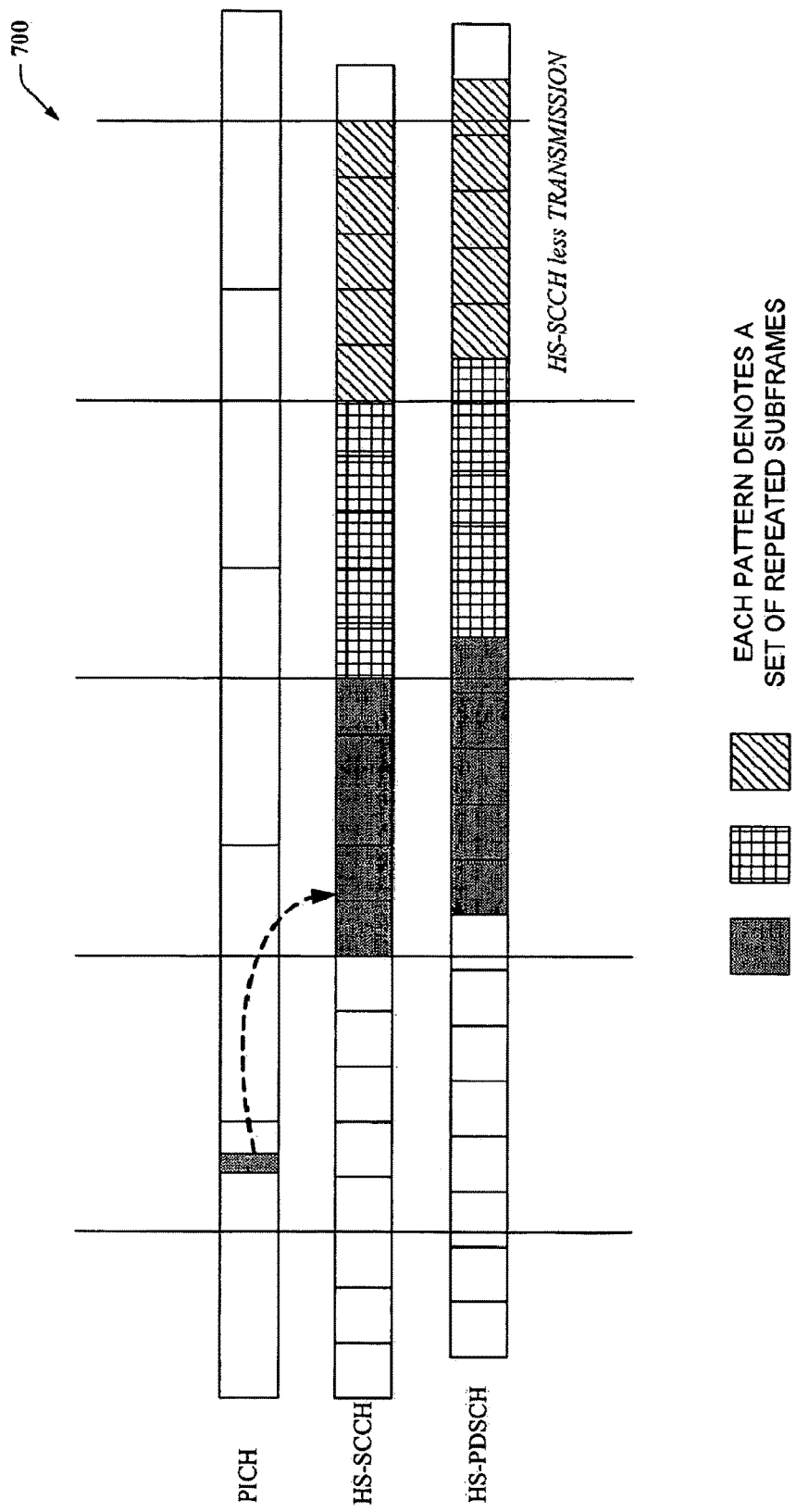
FIG. 7 is an illustration of an example diagram that depicts relative operation between paging indicators and high speed data.

In FIG. 7, an example 700 is illustrated that depicts PICH to HS operation. In example 700, the parameter NUM_HS_SCCH_SET1 is 5, BLIND_HARQ_NUM_RETRANS is 4, BLIND_HARQ_STRIDE is 0 and BLIND_HS_SCCH_SET2 is 10. Thus, in example 700, the UE monitors and attempts to receive 10 subframes after successful receipt of the first set under the same conditions as the first set. The UE wakes up 3 HS-SCCH subframes after the end of the PICH radio frame that includes the paging indicator. The UE attempt to decode any transmission on the associated HS-SCCH or HS-SCCH less channels wherein the transmission is repeated over 5 consecutive subframes. If the UE successfully decodes the HS-SCCH or HS-PDSCH transmission destined for the UE, it attempts to receive packets over the next 10 subframes.

Figure 8:
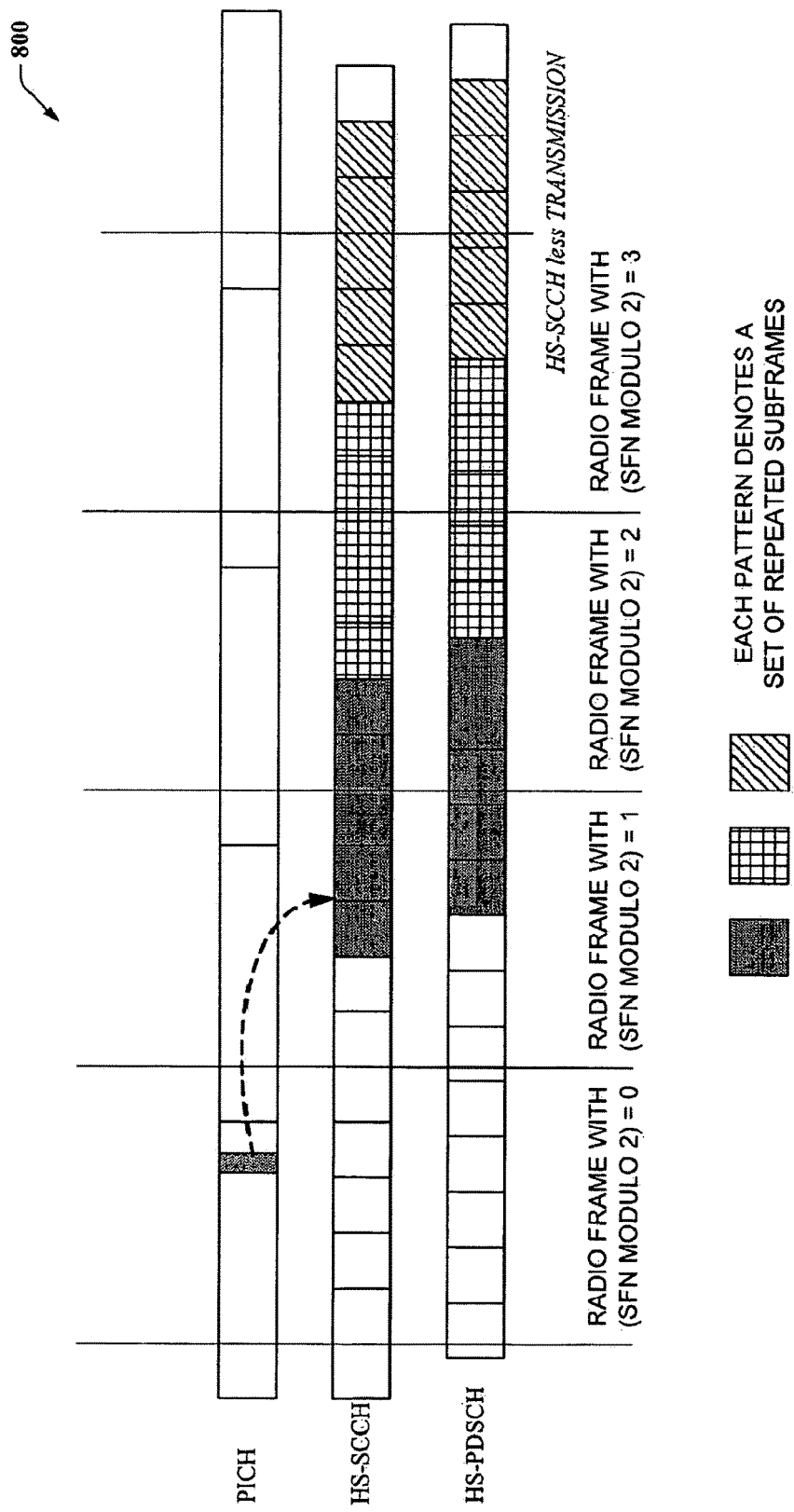
FIG. 8 is an illustration of an example diagram that depicts relative operation between paging indicators and high speed data.

In FIG. 8, an example 800 is illustrated in accordance with an aspect of the subject disclosure. Example 800 is similar to example 700 illustrated in FIG. 7. However, in example 800, the PICH is aligned with an S-CCPCH channel. The S-CCPCH channel is not aligned to the P-CCPCH radio frames.

Figure 9:
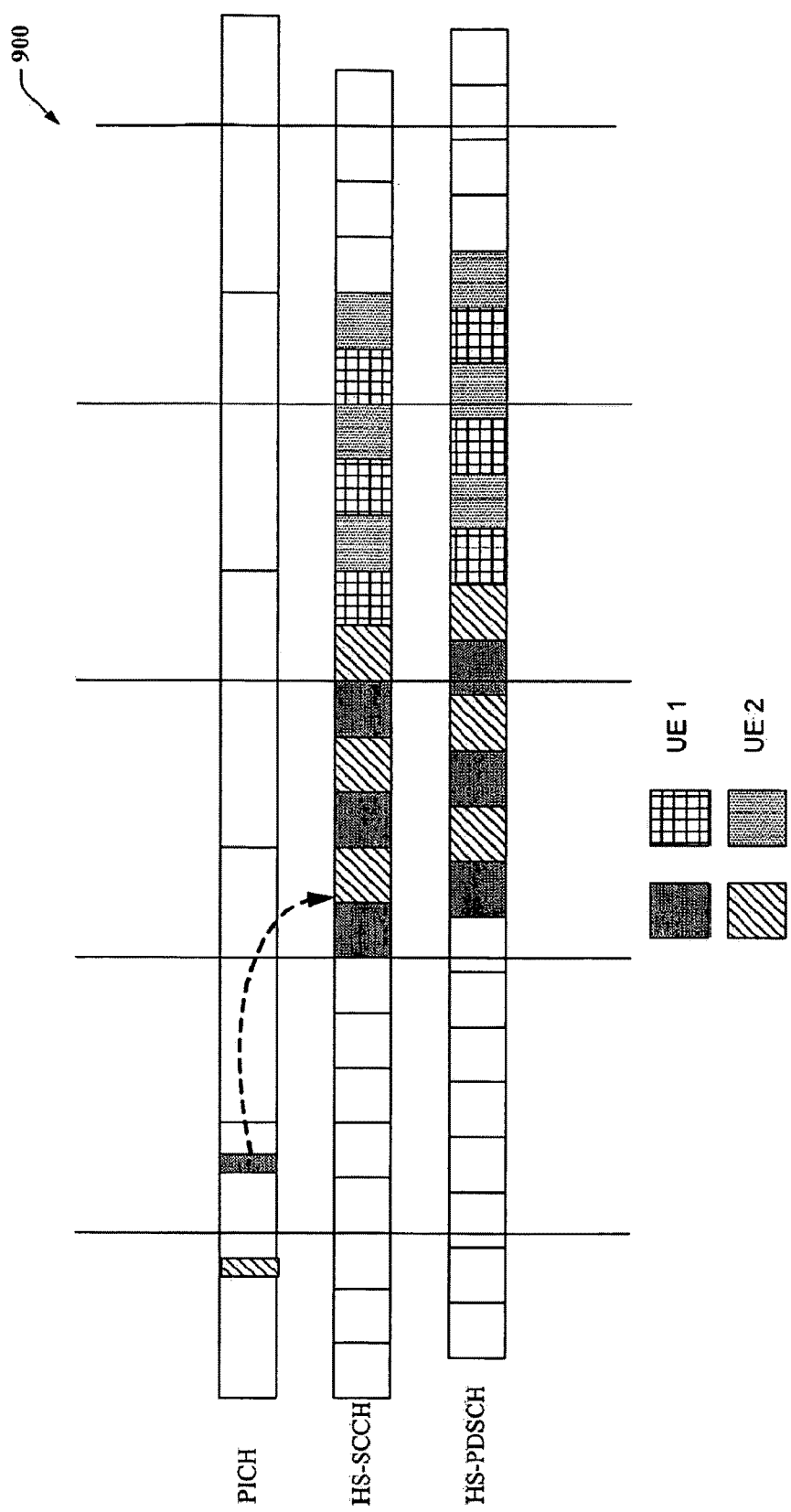
FIG. 9 is an illustration of an example diagram that depicts relative operation between paging indicators and high speed data.

In FIG. 9, an example 900 is illustrated according to another aspect of the subject disclosure. In example 900, PICH to high speed operation is depicted with two UEs, UE1 and UE2. In example 900, the parameter NUM_HS_SCCH_SET1 is 12, BLIND_HARQ_NUM_RETRANS is 2, BLIND_HARQ_STRIDE is 1 and BLIND_HS_SCCH_SET2 is 0. As shown in this example, UE1 and UE2 wake up 3 subframes after the end of the PICH radio frame that include the paging indicators to UE1 and UE2. UE1 and UE2 attempt to decode any transmission on the HS-SCCH channel or the HS-PDSCH channel (e.g., the HS-SCCH less channel) for the next 12 subframes. The transmission is repeated over 3 subframes that are one frame apart. As depicted in example 900, the subframes destined for UE1 are interleaved with subframes intended for UE2. After receiving 12 subframes, UE1 and UE2 can utilize DRX.

Figure 10:
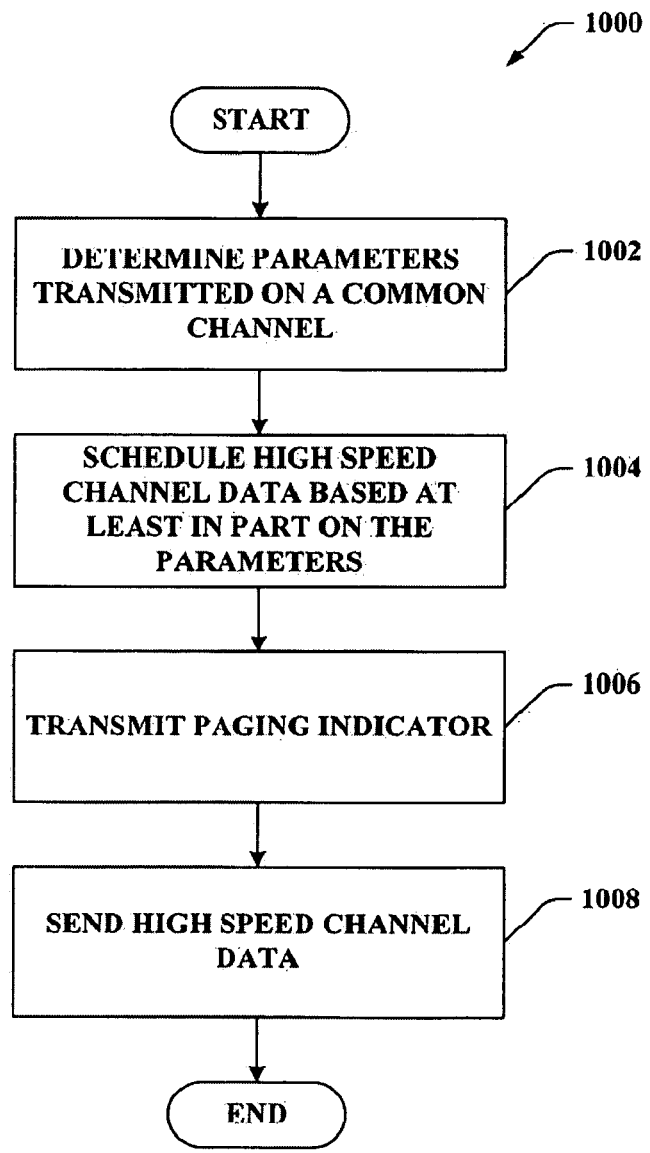
FIG. 10 is an illustration of an example methodology that facilitates employing a page channel to notify mobile devices of data on high speed channels.
Figure 11:
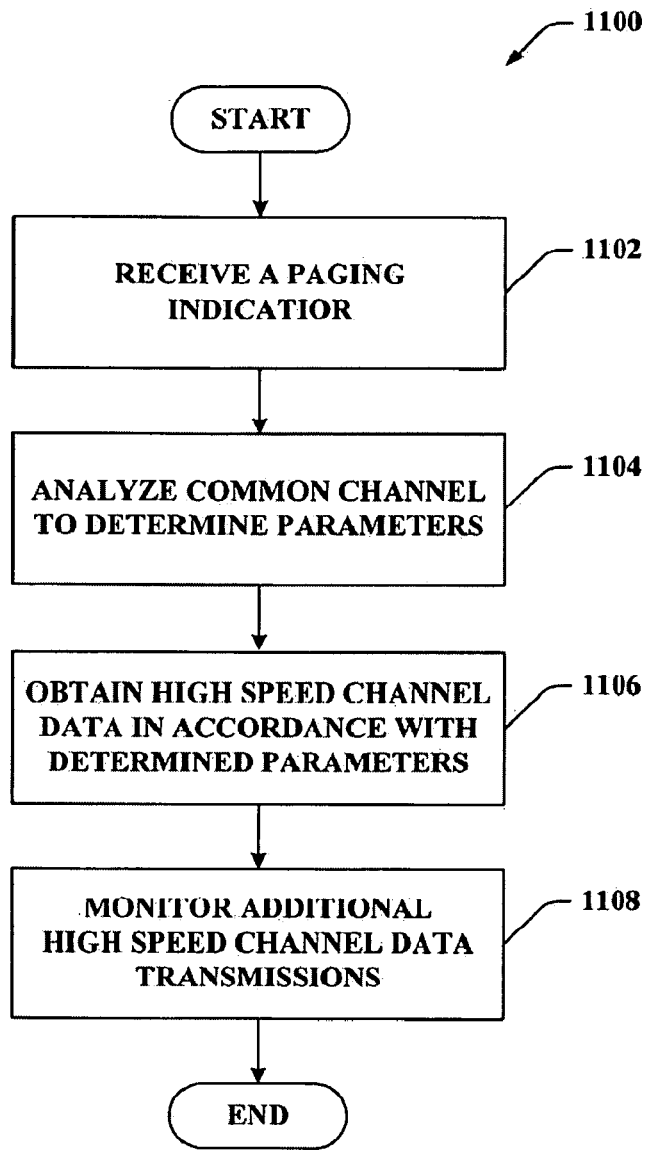
FIG. 11 is an illustration of an example methodology that facilitates receiving high speed data following notification on a paging channel.

Referring to FIGS. 10-11, methodologies relating to providing HS timing and operation in relation to a paging indicator on a PICH channel. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 10, illustrated is a methodology 1000 that facilitates employing a page channel to notify mobile devices of data on high speed channels. At reference numeral 1002, parameters are determined that are transmitted on a common channel to mobile devices to indicate how high speed data on high speed channels should be received. In one aspect, the common channel can be a broadcast channel. It is to be appreciated that a dedicated channel can also be employed. For example, the Pursuant to an illustration, the high speed data on the high speed channels is associated with a paging indicator on a PICH channel. At reference numeral 1004, high speed data is scheduled on a high speed channel in accordance with the determine parameters. In one embodiment, the high speed data can be control data on a high speed shared control channel (e.g., HS-SCCH) or user data on a high speed shared data channel (e.g., HS-DSCH). For example, the parameters can determine the number of repeats of a transmission and the degree of interleaving between one or more transmissions destined for distinct mobile devices. At reference numeral 1006, a paging indicator is transmitted to at least one mobile device. Pursuant to an illustration, the paging indicator is associated with a set subframes scheduled on the high speed channel according to the determined parameters. At reference numeral 1008, the high speed data is sent to at least one mobile device. The high speed data is sent as scheduled in the set of associated subframes.

Now referring to FIG. 11, a methodology 1100 methodology that facilitates receiving high speed data following notification on a paging channel is illustrated. At 1102, a paging indicator is received on a paging changing such as the PICH channel. The paging indicator on the PICH can indicate that a paging message, upper layer signaling specific to a mobile device or mobile device specific data is scheduled on an associated high speed channel. At reference numeral 1104, data on a common channel is analyzed to determine parameters contained therein. The parameters can define how high speed data associated with the paging indicator is scheduled on the high speed channel. The parameters instruct a mobile device as to how many subframes to attempt to receive, the configuration of the subframes, and whether or not to monitor following successful receipt. At reference numeral 1106, high speed data is obtained in accordance with the determined parameters. At reference numeral 1108, additional high speed transmissions are monitored following successful receipt of the obtained high speed data associated with the paging indicator.

It will be appreciated that, in accordance with one or more aspects described herein, inferences can be made regarding selecting and/or determining parameters employed in a paging indicator to specify data in associated high speed channels in a wireless communications network. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
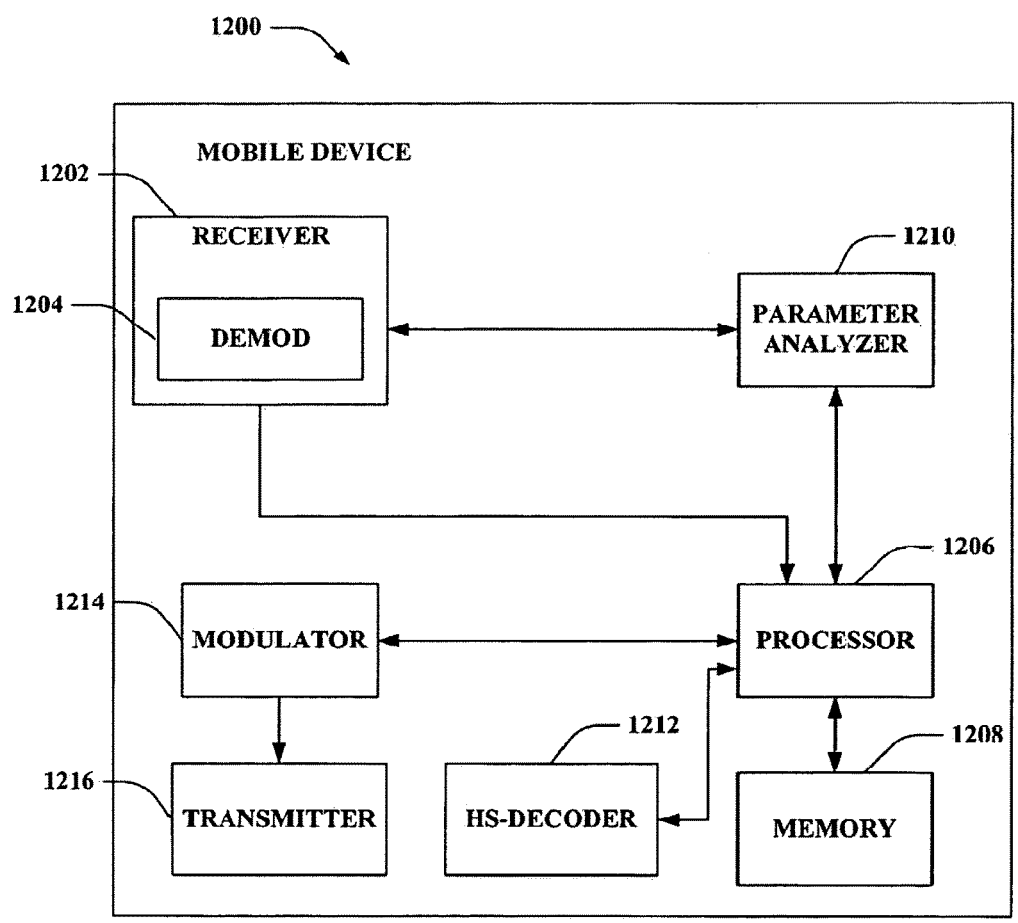
FIG. 12 is an illustration of an example mobile device that facilitates receiving a paging indicator that indicates data on a high speed channel.

FIG. 12 is an illustration of a mobile device 1200 that facilitates receiving a paging indicator that indicates data on a high speed channel. Mobile device 1200 comprises a receiver 1202 that receives a signal from, for instance, a receive antenna (not shown), performs typical actions on (e.g., filters, amplifies, downconverts, etc.) the received signal, and digitizes the conditioned signal to obtain samples. Receiver 1202 can comprise a demodulator 1204 that can demodulate received symbols and provide them to a processor 1206 for channel estimation. Processor 1206 can be a processor dedicated to analyzing information received by receiver 1202 and/or generating information for transmission by a transmitter 1216, a processor that controls one or more components of mobile device 1200, and/or a processor that both analyzes information received by receiver 1202, generates information for transmission by transmitter 1216, and controls one or more components of mobile device 1200.

Mobile device 1200 can additionally comprise memory 1208 that is operatively coupled to processor 1206 and that can store data to be transmitted, received data, information related to available channels, data associated with analyzed signal and/or interference strength, information related to an assigned channel, power, rate, or the like, and any other suitable information for estimating a channel and communicating via the channel. Memory 1208 can additionally store protocols and/or algorithms associated with estimating and/or utilizing a channel (e.g., performance based, capacity based, etc.).

It will be appreciated that the data store (e.g., memory 1208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1208 of the subject systems and methods is intended to comprise, without being limited to, these and any other suitable types of memory.

Processor 1206 can further be operatively coupled to a parameter analyzer 1210 that can analyze a parameters received by receiver 1202 to determine how data will be transmitted on a high speed channel in associated with a paging indicator as described supra, for instance. In one example, the paging indicator can specify that a paging message, user equipment specific upper layer signaling or device specific data is scheduled on the high speed channel. A common channel can transmit parameters that determine the organization and timing of the scheduled high speed data. The parameter analyzer 1210 can verify the parameters to enable the mobile device 1200 to configure itself to receive the data accordingly.

The processor 1206 can also be operatively coupled to an HS decoder 1212 that can that retrieves high speed data on the high speed channel (e.g., HS-SCCH or HS-PDSCH channel) in accordance with the parameters determined by the parameter analyzer 1210. According to an example, the mobile device 1200 can receive a paging indicator associated with data on a high speed channel and the HS decoder 1212 can receive and decode data based upon the parameters received on the common channel. Pursuant to an illustration, the HS decoder 1212 can decode the number of subframes on the high speed channels indicated by the corresponding parameter. Following successful receipt of the first set of subframes, the HS decoder 1212 can monitor and attempt to receive a second set of subframes. Mobile device 1200 still further comprises a modulator 1214 and transmitter 1216 that respectively modulate and transmit signals to, for instance, a base station, another mobile device, etc. Although depicted as being separate from the processor 1206, it is to be appreciated that the parameter 1210, HS decoder 1212, demodulator 1204, and/or modulator 1214 can be part of the processor 1206 or multiple processors (not shown).

Figure 13:
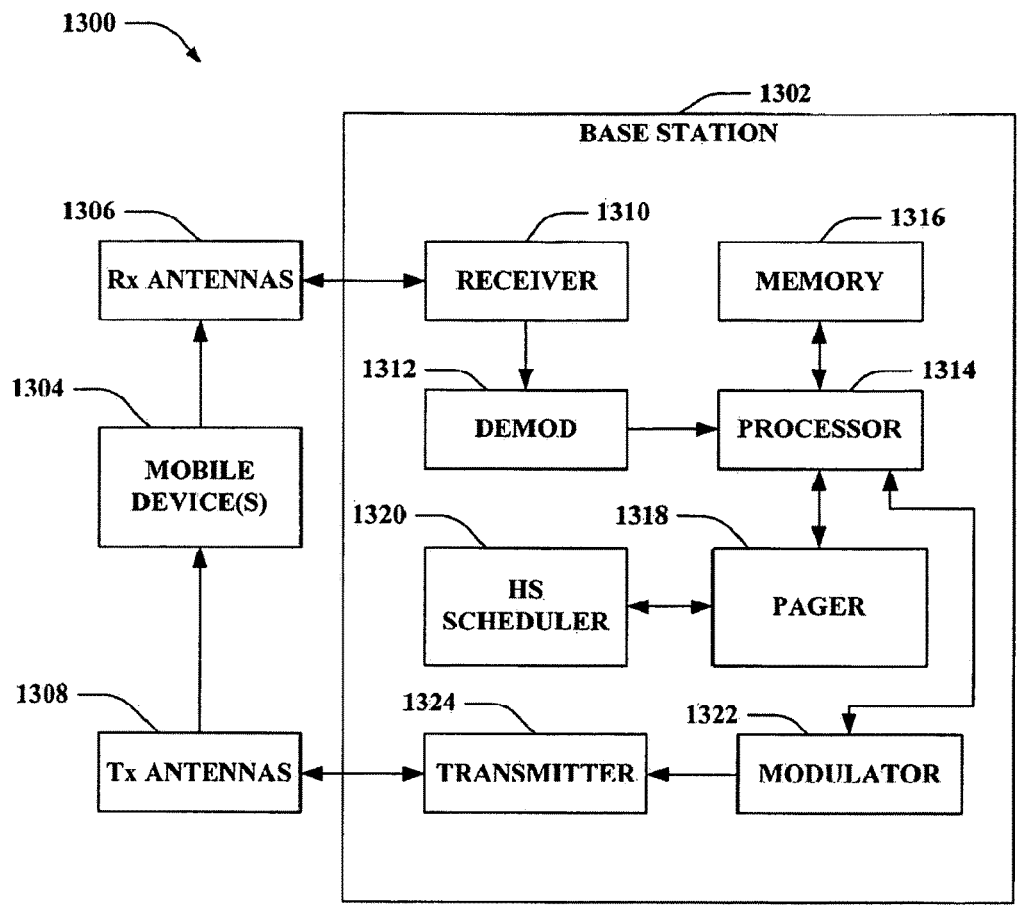
FIG. 13 is an illustration of an example system that facilitates employing a paging channel in connection with high speed channels.

FIG. 13 is an illustration of a system 1300 that facilitates that facilitates employing a paging channel in connection with high speed channels as described supra. The system 1300 comprises a base station 1302 (e.g., access point, . . . ) with a receiver 1310 that receives signal(s) from one or more mobile devices 1304 through a plurality of receive antennas 1306, and a transmitter 1324 that transmits to the one or more mobile devices 1304 through a transmit antenna 1308. Receiver 1310 can receive information from receive antennas 1306 and is operatively associated with a demodulator 1312 that demodulates received information. Demodulated symbols are analyzed by a processor 1314 that can be similar to the processor described above with regard to FIG. 12, and which is coupled to a memory 1316 that stores information related to estimating a signal (e.g., pilot) strength and/or interference strength, data to be transmitted to or received from mobile device(s) 1304 (or a disparate base station (not shown)), and/or any other suitable information related to performing the various actions and functions set forth herein. Processor 1314 is further coupled to a pager 1318 that can set paging indicators transmitted to one or more mobile devices 1304. Moreover, the processor 1314 can be coupled to a HS scheduler 1320 that can schedule and transmit high speed data associated with the PICH channel for the mobile devices 1304 corresponding to the paging indicators and parameters transmitted on a common channel.

According to an example, the base station 1302 can obtain data for the mobile devices 1304. The data can be from another mobile device (e.g., a voice communication, a data transfer, etc.), a wired device on a network communicatively coupled to the base station 1302, a server and the like. It is to be appreciated that the base station 1302 can possess data to be transmitted to the mobile devices 1304 (e.g. power control data, assignment data, etc.). The pager 1318 can transmit a paging indicator to the mobile devices 1304 on the PICH channel to notify the mobile devices 1304 that data is waiting. Following the paging indicator, the HS scheduler 1320 of the base station 1302 schedules a paging message, upper layer signaling and/or specific data on the high speed channels in accordance with the parameters on the common channel (e.g., schedules the information on the set of associated subframes). Although depicted as being separate from the processor 1314, it is to be appreciated that the pager 1318, HS scheduler 1320, demodulator 1312, and/or modulator 1322 can be part of the processor 1314 or multiple processors (not shown).

Figure 14:
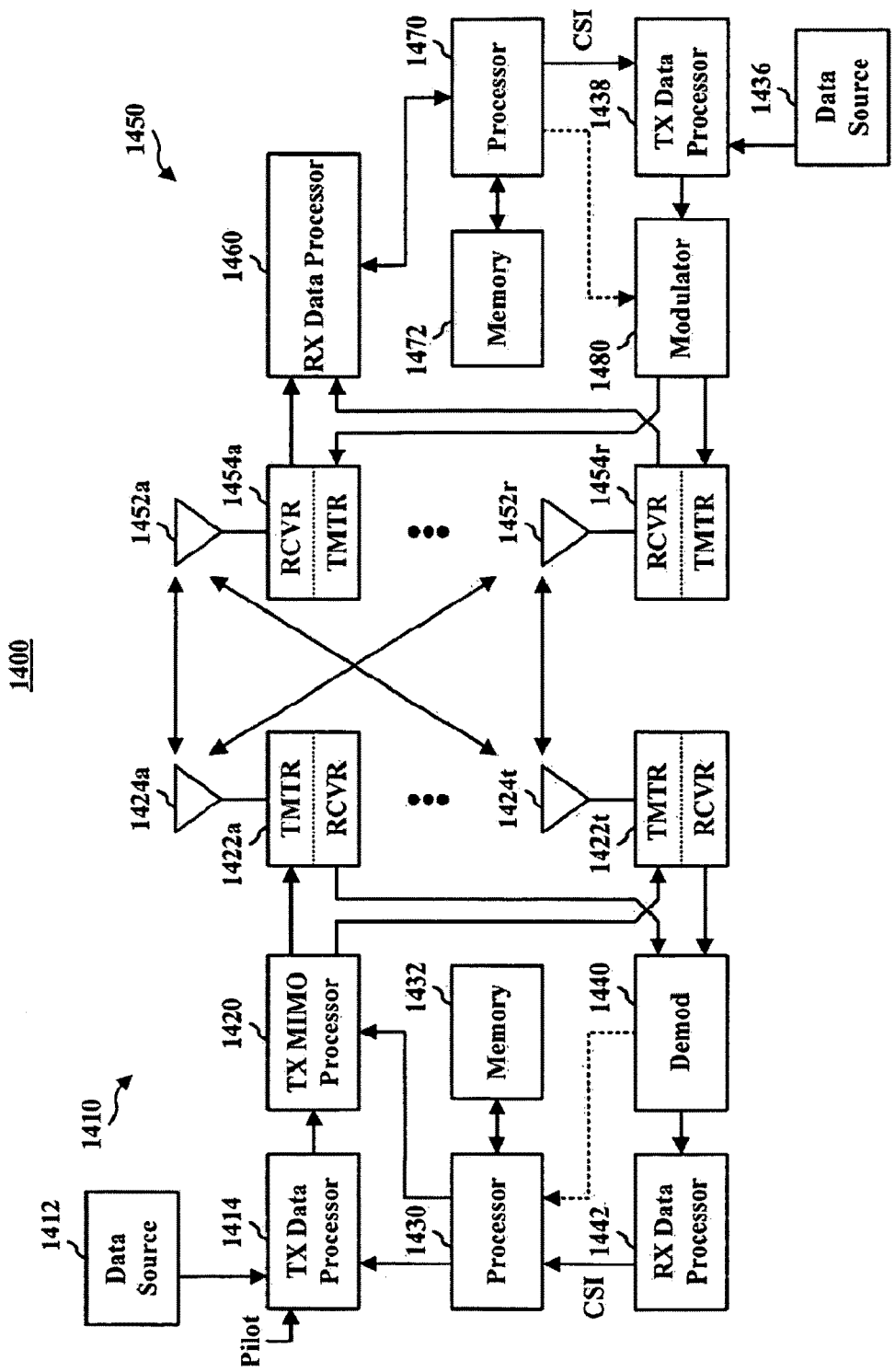
FIG. 14 is an illustration of an example wireless network environment that can be employed in conjunction with the various systems and methods described herein.

FIG. 14 shows an example wireless communication system 1400. The wireless communication system 1400 depicts one base station 1410 and one mobile device 1450 for sake of brevity. However, it is to be appreciated that system 1400 can include more than one base station and/or more than one mobile device, wherein additional base stations and/or mobile devices can be substantially similar or different from example base station 1410 and mobile device 1450 described below. In addition, it is to be appreciated that base station 1410 and/or mobile device 1450 can employ the systems (FIGS. 1-3 and 12-13), techniques/configurations/examples (FIGS. 4-9) and/or methods (FIGS. 10-11) described herein to facilitate wireless communication there between.

At base station 1410, traffic data for a number of data streams is provided from a data source 1412 to a transmit (TX) data processor 1414. According to an example, each data stream can be transmitted over a respective antenna. TX data processor 1414 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1450 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1430.

The modulation symbols for the data streams can be provided to a TX MIMO processor 1420, which can further process the modulation symbols (e.g., for OFDM). TX MIMO processor 1420 then provides $N_T$ modulation symbol streams to $N_T$ transmitters (TMTR) 1422a through 1422t. In various embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1422a through 1422t are transmitted from $N_T$ antennas 1424a through 1424t, respectively.

At mobile device 1450, the transmitted modulated signals are received by $N_R$ antennas 1452a through 1452r and the received signal from each antenna 1452 is provided to a respective receiver (RCVR) 1454a through 1454r. Each receiver 1454 conditions (e.g., filters, amplifies, and downconverts) a respective signal, digitizes the conditioned signal to provide samples, and further processes the samples to provide a corresponding "received" symbol stream.

An RX data processor 1460 can receive and process the $N_R$ received symbol streams from $N_R$ receivers 1454 based on a particular receiver processing technique to provide $N_T$ "detected" symbol streams. RX data processor 1460 can demodulate, deinterleave, and decode each detected symbol stream to recover the traffic data for the data stream. The processing by RX data processor 1460 is complementary to that performed by TX MIMO processor 1420 and TX data processor 1414 at base station 1410.

A processor 1470 can periodically determine which precoding matrix to utilize as discussed above. Further, processor 1470 can formulate a reverse link message comprising a matrix index portion and a rank value portion.

The reverse link message can comprise various types of information regarding the communication link and/or the received data stream. The reverse link message can be processed by a TX data processor 1438, which also receives traffic data for a number of data streams from a data source 1436, modulated by a modulator 1480, conditioned by transmitters 1454a through 1454r, and transmitted back to base station 1410.

At base station 1410, the modulated signals from mobile device 1450 are received by antennas 1424, conditioned by receivers 1422, demodulated by a demodulator 1440, and processed by a RX data processor 1442 to extract the reverse link message transmitted by mobile device 1450. Further, processor 1430 can process the extracted message to determine which precoding matrix to use for determining the beamforming weights.

Processors 1430 and 1470 can direct (e.g., control, coordinate, manage, etc.) operation at base station 1410 and mobile device 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 15:
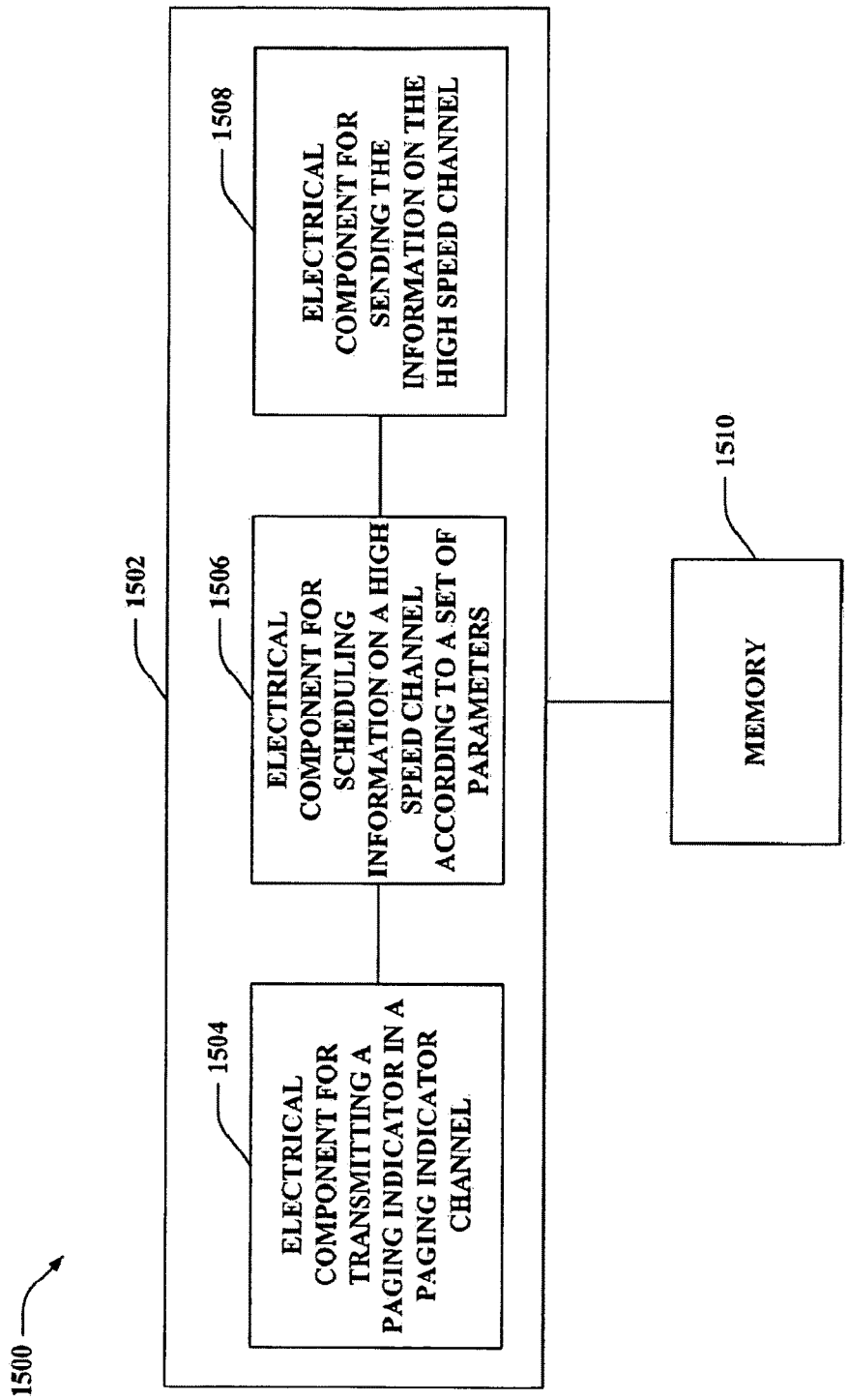
FIG. 15 is an illustration of an example system that enables a paging channel to be employed with high speed channels.

With reference to FIG. 15, illustrated is a system 1500 that enables a paging channel to be employed with high speed channels. For example, system 1500 can reside at least partially within a base station, mobile device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for transmitting a paging indicator on a paging indicator channel 1504. For example, data destined for a mobile device can be scheduled and/or waiting on another channel. A paging indicator informs the mobile device that it is possible being page and should read the other channel to verify and/or retrieve data. Further, logical grouping 1502 can include an electrical component for scheduling information on a high speed channel according to a set of parameters. In an embodiment, the paging indicator channel can operate with a high speed channel (e.g., HS-SCCH, HS-PDSCH, etc.). A common channel can include parameters that specify when and how the information should be scheduled on the high speed channel. Moreover, the logical grouping 1502 can include an electrical component for sending information on the high speed channel. Once scheduled, the information can be transmitted accordingly. Additionally, system 1500 can include a memory 1510 that retains instructions for executing functions associated with electrical components 1504, 1506, and 1508. While shown as being external to memory 1510, it is to be understood that one or more of electrical components 1504, 1506, and 1508 can exist within memory 1510.

Figure 16:
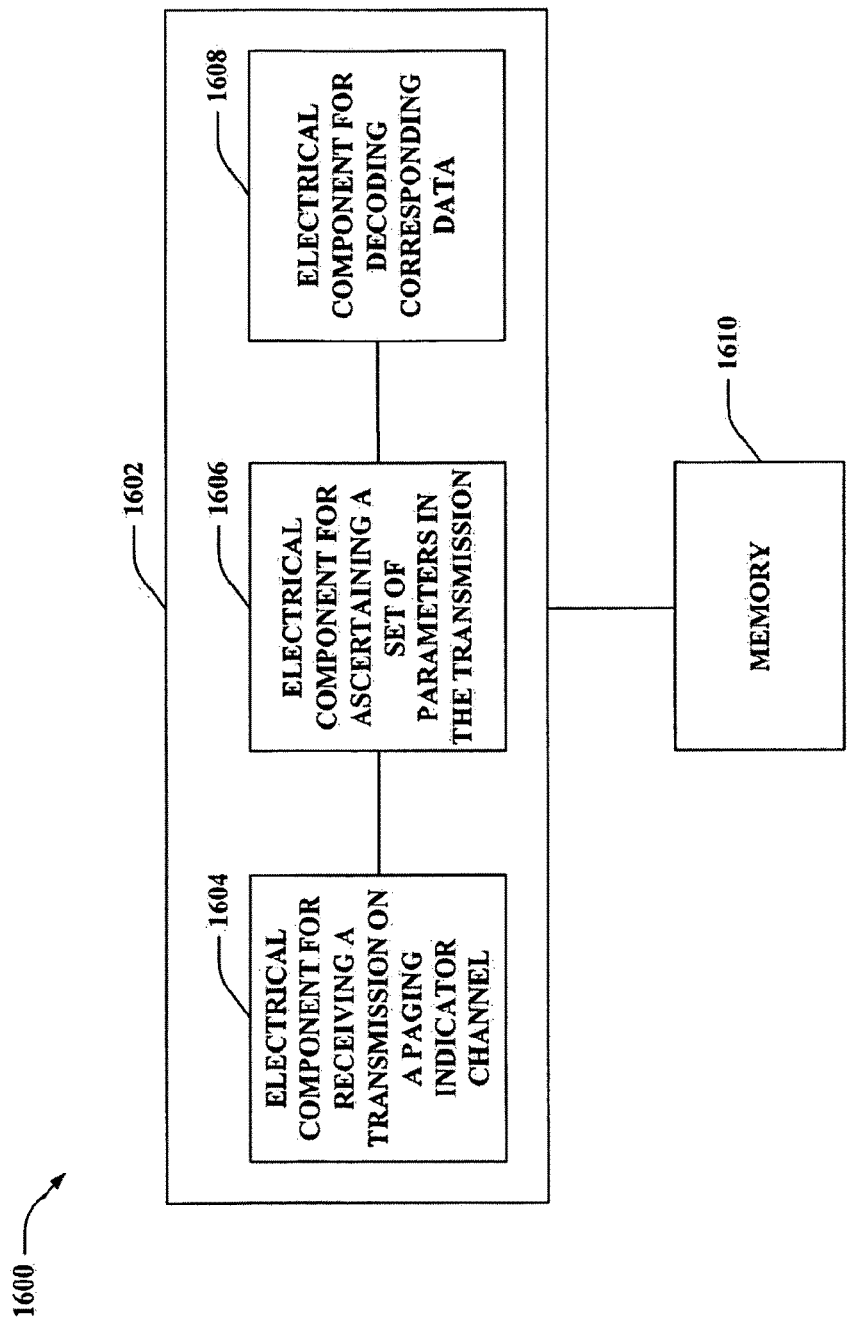
FIG. 16 is an illustration of an example system that receives high speed channel data based upon a paging indicator.

Turning to FIG. 16, illustrated is a system 1600 that receives high speed channel data based upon a paging indicator in a wireless communications network. System 1600 can reside within a base station, mobile device, etc., for instance. As depicted, system 1600 includes functional blocks that can represent functions implemented by a processor, software, or combination thereof (e.g., firmware). System 1600 includes a logical grouping 1602 of electrical components that facilitate receiving high speed channel data in response to a paging indicator. Logical grouping 1602 can include an electrical component for receiving a transmission on a paging indicator channel 1604. The transmission can be a paging indicator that informs that a paging message, UE specific upper layer signaling or UE specific data is scheduled on a high speed channel. Moreover, logical grouping 1602 can comprise an electrical component for the set of parameters in a common channel transmission 1606. In addition, the logical grouping 1602 can include an electrical component for decoding corresponding data on the high speed channel 1608. For example, the ascertained set of parameters can be utilized to configure a decoder to properly decode the data based upon its schedule. Additionally, system 1600 can include a memory 1610 that retains instructions for executing functions associated with electrical components 1604, 1606, and 1608. While shown as being external to memory 1610, it is to be understood that electrical components 1604, 1606, and 1608 can exist within memory 1610.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for using a paging indicator in a wireless communication system, comprising:
   transmitting, to a mobile device on a paging indicator channel (PICH), a paging indicator frame comprising a paging indicator, wherein the paging indicator identifies one or more subframes on a high-speed shared data channel intended for the mobile device;
   transmitting, to the mobile device on a high-speed shared control channel, a set of parameters, wherein the set of parameters comprise a timing offset between the end of the paging subframe and the beginning of the one or more subframes on the high-speed shared data channel intended for the mobile device, the parameters being configured for use by the mobile device to receive data on the high-speed shared data channel; and
   transmitting the one or more subframes on the high-speed shared data channel.

2. The method of claim 1, wherein the set of parameters further comprises a first number of subframes that the mobile device should attempt to receive on the high-speed shared data channel.

3. The method of claim 1, wherein the set of parameters further comprises a second number of subframes that the mobile device should attempt to receive on the high-speed shared data channel.

4. The method of claim 3, wherein the set of parameters further comprises a stride parameter configured to indicate to the mobile device a spacing of the one or more subframes on the high-speed shared data channel intended for the mobile device.

5. The method of claim 1, wherein the one or more subframes on the high-speed shared data channel include at least one of a paging message, mobile device specific upper layer signaling, or mobile device specific data.

6. The method of claim 1, wherein the wireless communication system is an LTE system.

7. The method of claim 6, wherein the set of parameter is based upon scope and content of data to be transmitted to the mobile device.

8. The method of claim 1, wherein a timing of the paging indicator frame is based at least in part on the discontinuous reception (DRX)/wake up cycle of mobile device.

9. The method of claim 1, further comprising: scheduling the one or more subframes for transmission on the high-speed shared data channel in accordance with the set of parameters transmitted to the mobile device.

10. The method of claim 1, wherein the set of parameters comprises a hybrid automatic repeat request (HARQ) configuration.

11. A non-transitory machine-readable medium having stored thereon machine-executable instructions that when executed by a wireless communication device configured to operate in a wireless communication system, cause the wireless communication device to perform a method comprising:
    transmitting, to a mobile device on a paging indicator channel (PICH), a paging indicator frame comprising the paging indicator, wherein the paging indicator identifies one or more subframes on a high-speed shared data channel intended for the mobile device;
    transmitting, to the mobile device on a high-speed shared control channel, a set of parameters, wherein the set of parameters comprise a timing offset between the end of the paging subframe and the beginning of the one or more subframes on the high-speed shared data channel intended for the mobile device, the parameters being configured for use by the mobile device to receive data on the high-speed shared data channel; and
    transmitting the one or more subframes on the high-speed shared data channel.

12. The non-transitory machine-readable medium of claim 11, wherein the set of parameters further comprises a first number of subframes that the mobile device should attempt to receive on the high-speed shared data channel.

13. The non-transitory machine-readable medium of claim 11, wherein the set of parameters further comprises a second number of subframes that the mobile device should attempt to receive on the high-speed shared data channel.

14. The non-transitory machine-readable medium of claim 13, wherein the set of parameters further comprises a stride parameter configured to indicate to the mobile device a spacing of the one or more subframes on the high-speed shared data channel intended for the mobile device.

15. The non-transitory machine-readable medium of claim 11, wherein the one or more subframes on the high-speed shared data channel include at least one of a paging message, mobile device specific upper layer signaling, or mobile device specific data.

16. The non-transitory machine-readable medium of claim 11, wherein the wireless communication system is an LTE system.

17. The non-transitory machine-readable medium of claim 16, wherein the set of parameter is based upon scope and content of data to be transmitted to the mobile device.

18. The non-transitory machine-readable medium of claim 11, wherein a timing of the paging indicator frame is based at least in part on the discontinuous reception (DRX)/wake up cycle of mobile device.

19. The non-transitory machine-readable medium of claim 11, further comprising: scheduling the one or more subframes for transmission on the high-speed shared data channel in accordance with the set of parameters transmitted to the mobile device.

20. The non-transitory machine-readable medium of claim 11, wherein the set of parameters comprises a hybrid automatic repeat request (HARQ) configuration.

21. A wireless communication apparatus configured to operate in a wireless communication system, comprising:
    a memory comprising executable instructions;
    a processor in data communication with the memory and configured to execute the executable instructions and cause the communication apparatus to:
       transmit, to a mobile device on a paging indicator channel (PICH), a paging indicator frame comprising a paging indicator, wherein the paging indicator identifies one or more subframes on a high-speed shared data channel intended for the mobile device;
       transmit, to the mobile device on a high-speed shared control channel, a set of parameters, wherein the set of parameters comprise a timing offset between the end of the paging subframe and the beginning of the one or more subframes on the high-speed shared data channel intended for the mobile device, the parameters being configured for use by the mobile device to receive data on the high-speed shared data channel; and transmit the one or more subframes on the high-speed shared data channel.

22. The wireless communication apparatus of claim 21, wherein the set of parameters further comprises a first number of subframes that the mobile device should attempt to receive on the high-speed shared data channel.

23. The wireless communication apparatus of claim 21, wherein the set of parameters further comprises a second number of subframes that the mobile device should attempt to receive on the high-speed shared data channel.

24. The wireless communication apparatus of claim 23, wherein the set of parameters further comprises a stride parameter configured to indicate to the mobile device a spacing of the one or more subframes on the high-speed shared data channel intended for the mobile device.

25. The wireless communication apparatus of claim 21, wherein the one or more subframes on the high-speed shared data channel include at least one of a paging message, mobile device specific upper layer signaling, or mobile device specific data.

26. The wireless communication apparatus of claim 21, wherein the wireless communication system is an LTE system.

27. The wireless communication apparatus of claim 26, wherein the set of parameter is based upon scope and content of data to be transmitted to the mobile device.

28. The wireless communication apparatus of claim 21, wherein a timing of the paging indicator frame is based at least in part on the discontinuous reception (DRX)/wake up cycle of mobile device.

29. The wireless communication apparatus of claim 21, wherein the processor is further configured to cause the wireless communication apparatus to: schedule the one or more subframes for transmission on the high-speed shared data channel in accordance with the set of parameters transmitted to the mobile device.

30. The wireless communication apparatus of claim 21, wherein the set of parameters comprises a hybrid automatic repeat request (HARQ) configuration.

* * * * *